US010262517B2

(12) United States Patent
Bobda

(10) Patent No.: US 10,262,517 B2
(45) Date of Patent: Apr. 16, 2019

(54) REAL-TIME AWARENESS OF ENVIRONMENTAL HAZARDS FOR FALL PREVENTION

(71) Applicant: BOARD OF TRUSTEES OF THE UNIVERSITY OF ARKANSAS, Little Rock, AR (US)

(72) Inventor: Christophe Bobda, Fayetteville, AR (US)

(73) Assignee: Board of Trustees of the University of Arkansas, Fayetteville, AR (US)

(*) Notice: Subject to any disclaimer, the term of this patent is extended or adjusted under 35 U.S.C. 154(b) by 125 days.

(21) Appl. No.: 15/622,389

(22) Filed: Jun. 14, 2017

(65) Prior Publication Data

US 2017/0358195 A1 Dec. 14, 2017

Related U.S. Application Data

(60) Provisional application No. 62/349,721, filed on Jun. 14, 2016.

(51) Int. Cl.
| | | |
|---|---|---|
| G08B 21/04 | (2006.01) |
| G06K 9/00 | (2006.01) |
| H04N 5/232 | (2006.01) |
| G06T 7/11 | (2017.01) |
| H04N 7/18 | (2006.01) |
| G08B 13/196 | (2006.01) |

(52) U.S. Cl.
CPC ..... *G08B 21/0476* (2013.01); *G06K 9/00771* (2013.01); *G06T 7/11* (2017.01); *G08B 13/19613* (2013.01); *G08B 21/043* (2013.01); *H04N 5/23293* (2013.01); *H04N 7/188* (2013.01)

(58) Field of Classification Search
CPC .......... G08B 21/0476; G08B 13/19613; H04N 7/188; H04N 5/23293
See application file for complete search history.

(56) References Cited

U.S. PATENT DOCUMENTS

| 9,946,948 B2* | 4/2018 | Yazaki | G06K 9/00369 |
| 2015/0339519 A1* | 11/2015 | Ueta | H04N 5/275 |
| | | | 382/103 |

OTHER PUBLICATIONS

Close et al; Prevention of falls in the elderly trial (profet): a randomized controlled trial; The Lancet, vol. 353, No. 9147; pp. 93-97; 1999 [online] http://www.sciencedirect.com/science/article/pii/S0140673698061194.

L Z. Rubenstein and K. R Josephson, "Falls and their prevention in elderly people: What does the evidence show?" Medical Clinics of North America, vol. 90, No. 5, pp. 807-824, 2006, Geriatric Medicine. [Online]. Available: http://www.sciencedirect.com/science/article/pii/S0025712506000514.

(Continued)

*Primary Examiner* — Nam D Pham
(74) *Attorney, Agent, or Firm* — Keith A. Vogt; Vogt IP

(57) ABSTRACT

A system for processing of information of an environment containing objects and a person. One or more cameras are used to view and capture an image of an environment in which a person is located. The images may be masked to maintain privacy during remote viewing by a third-party.

13 Claims, 3 Drawing Sheets

(56) References Cited

OTHER PUBLICATIONS

J. M. Hausdorff, D. A Rios, and H. K. Edelberg, "Gait variability and fall risk in community-living older adults: A 1-year prospective study;" Archives of Physical Medicine and Rehabilitation, vol. 82, No. 8, pp. 1050-1056, 2001. [Online]. Available: http:/ www.sciencedirect.com/science/article/pii/80003999301632155.

P. Kannus, H. Sievnen, M. Palvanen, T. Jrvinen, and J. Parkkari, "Prevention of falls and consequent injuries in elderly people," The Lancet, vol. 366, No. 9500, pp. 1885-1893, 2005. [Online]. Available: http://www.sciencedirect.com/science/article/pii/S0140673605676040.

A. Bergland and T. B. Wyller, "Risk factors for serious fall related injury in elderly women living at home," Injury Prevention, vol. 10, No. 5, pp. 308-313, 2004. [Online]. Available: http://injuryprevention.bmj.com/content/10/5/308.abstract.

S. L. Vaught, "Gait, balance, and fall prevention," The Ochsner Journal, vol. 3, No. 2, pp. 94-97, 2001. [Online]. Available: http://www.ochsnerjournal.org/doi/abs/1 0.1043/1524- 5012%282001%29003%5B0094%3AGBAFP%502.0.C0%382.

R. Hartmann, F. A Machot, P. Mahr, and C. Bobda, "Camera-based system for tracking and position estimation of humans," in Design and Architectures for Signal and Image Processing {DASIP}, 2010 Conference on, Oct. 2010, pp. 62-67.

A. Williams, D. Ganesan, and A. Hanson, "Aging in place: fall detection and localization in a distributed smart camera network," in Proceedings of the 15th International Conference on Multimedia, 2007.

M. Lan, A. Nahapetian, A Vandatpour, L. Au, W. Kaiser, and M. Sarrafzadeh, "Smartfall: An automatic fall detection system based on subsequence matching for the smaitcane," in Proceedings of the Fourth International Conference on Body Area Networks, ser. BodyNets '09. !CST, Brussels, Belgium, Belgium: ICST {Institute for Computer Sciences, Social-Informatics and Telecommunications Engineering), 2009, pp. 8:1-8:8. [Online]. Available: http:I/dx.doi.prg/10.4108/ICST. BODYNETS2009.5873.

L. Liu, M. Popescu, M. Skubic, M. Rantz, T. Yardibi, and P. Cuddihy, "Automatic fall detection based on doppler radar motion signature," in Pervasive Computing Technologies for Healthcare (PervasiveHealth), 2011 5th International Conference on, May 2011, pp. 222-225.

S. V. Kumar, K. Manikandan, and N. Kumar, "Novel fall detection algorithm for the elderly people," in Science Engineering and Management Research (ICSEMR), 2014International Conference on, Nov. 2014, pp. 1-3.

Myra A. Aud, C. A Carmen, W. T. Harry, V. N. Rohan, G. S. Uday, M. Ashrafuddin, and K. D. Krishna, "Smart carpet: Developing a sensor system to detect falls and summon assistance," Journal of Gerontological Nursing, vol. 6, No. 3, pp. 202-215, Jul. 2010.

M. Chen, B. Huang, andY. Xu, "Intelligent shoes for abnormal gait detection," in Robotics and Automation, 2008. ICRA 2008. IEEE International Conference on, May 2008, pp. 2019-2024.

B. Abinaya, V. Latha, and M. Suchetha, "An advanced gait monitoring system based on air pressure sensor embedded in a shoe," Procedia Engineering, vol. 38, pp. 1634-1643, 2012, International Conference on Modeling, Optimization and Computing; ELSEVIER; www.sciencedcirect.com.

Alimed, "Pressure Mats and Fall Monitoring Solutions," http://www.alimed.com/patient-safety~fall-management/, 2016.

Careview; "CareView Patient Monitoring Solution," http://www.care-view.com//, 2016.

N. Dalal and B. Triggs, "Histograms of oriented gradients for human detection," in International Conference on Computer Vision & Pattern Recognition, . C. Schmid, s. Soatto, and C. Tomasi, Eds, vol. 2, INRIA, Rhone-Alpes, ZIRST-655, av. de l'Europe, Montbonnot-38334, Jun. 2005, pp. 886-893. [Online]. Available: http://lear.inrialpes.fr/pubs/2005/DT05.

P. Viola and M. Jones, "Rapid object detection using a boosted cascade of simple features," in Computer Vision and Pattem Recognition, 2001. CVPR 2001. Proceedings of the 2001 IEEE Computer Society Conference on, vol. 1, 2001, pp. 1-511-1-518 vol. 1.

Z.Zivkovic, "Improved adaptive gausian mixture model for background subtraction," in Proceedings of the International Conference of Pattern Recognition, 2004.

Z.Zivkovic and F. der Heijden, "Efficient adaptive density estimation per image pixel for the task of background subtraction," Pattern Recognition Letters, vol. 27, No. 7, pp. 773-780,2006.

Y. S. Yilmaz, B. I. Aydin, and M. Demirbas, "Google cloud messaging (gem): An evaluation," Globecom 2014—Symposium on Selected Areas in Communications: GC14 SAC Internet of Things, pp. 2847-2852,2014.

Jeffrey Kutchka, Danielle Tchuinkou, Joel Mandebi, Erman Nghonda and Christophe Bobda: Automatic Assessment of Environmental Hazards for Fall Prevention Using Smart-Cameras, in Proceedings of the First Workshop in Cloud connected Health, Washington DC, Jun. 27-29, 2016 (Under Review).

\* cited by examiner

REAL-TIME AWARENESS OF ENVIRONMENTAL HAZARDS FOR FALL PREVENTION

RELATED APPLICATIONS

This application claims the benefit of U.S. Provisional Application No. 62/349,721, filed Jun. 14, 2016 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Falling is one of the growing problems of the elderly and is a common call to accident and emergency departments. Falls are a complex geriatric syndrome with various consequences ranging from mortality, morbidity, reduced functioning, and premature nursing home admissions. Around 40% of people aged 65 years and older fall annually, a rate which increases above 50% with advanced age and among people who live in residential care facilities or nursing homes. Even though falls do not always lead to injury, about 20% of those who fall need medical attention, 5% result in a fracture, and other serious injuries, including severe head injuries, joint distortions and dislocations. Soft-tissue bruises, contusions, and lacerations arise in 5 to 10% of cases. These percentages can be more than doubled for women aged 75 years or older. Fall-associated health care costs in the United States was estimated in 2001 as high as $500 million/year, a figure that does not assess the individual morbidity involved (disability, dependence, depression, unemployment, inactivity).

The need for strategies to reduce falls in the elderly is huge and growing, as the proportion of older people increases. As a consequence, technical solutions have been proposed for fall detection. This includes the use of smart cameras to localize people lying on the floor, smart canes to measure the sequence of events and gauge balance, Doppler radar, and multisensor combinations such as accelerometers and blood pressure and pressure sensors. While those solutions could help in detecting falls and raising alarms, they are only useful when falls have already occurred, with all the negative consequences. Strategies for preventing falls are urgently desired.

Unlike fall detection, automatic fall prediction is very challenging, in particular because of the difficulty of understanding the complex combination of intrinsic impairments and disabilities, and the environmental hazards that contribute to the causes. First, falls are multifactorial events that result from interactions between hazardous environment, hazards or hazardous activities and increased individual susceptibility from accumulated effects of age and disease. For instance, age-related changes in posture, muscle strength, and step height can impair a person's ability to avoid a fall after an unexpected trip or while reaching or bending. Accurate understanding of fall-related factors and their impact on the balance behavior of individuals is of importance. Secondly, tracking all related causes and deriving a clear picture require a viable distributed sensing infrastructure, as well as appropriate fusion methods to predict falls and alert patients, with the lowest possible false positive.

Published work in fall prevention is limited to off-line patient medication and environmental assessment. Real-time assessment of fall-related causes is addressed only in part in state-of-the-art research. For instance, smart carpets have been used to predict falls in elderly people with Alzheimer's. Other technologies make use of "smart shoes" to study the gait behavior of individuals. While these approaches may contribute to a fall prevention system, they fail to consider the intrinsic combination of all risk factors, particularly environmental hazards and configurations, to derive a more accurate picture of fall dangers for each individual.

More pragmatic solutions currently in use in hospitals and elderly care facilities are limited to protection around the bed with mats to limit the effect of falling. The more technical solutions use a pressure sensor above the mattress to detect patients leaving their beds and thereby alerting the caregivers. The main drawback of this solution is the high amount of blind notifications sent to the healthcare provider for every movement of the patient in and out of bed.

Frequent visits in patients' room just to figure out that the patient is sleeping are at best annoying. A viable solution would provide a global view of the patient space and patient position in the room so the caregiver can assess dangerous situations and decide on what action to take. In this regard, commercial solutions such as Careview use a camera to stream an image of the patients' room to the caregiver. Besides privacy concerns, caregivers have to constantly be watching the videos. With dozens of patients to monitor, this solution is not optimal.

BRIEF SUMMARY OF THE INVENTION

In one embodiment, the present invention concerns providing solutions in assisted living, with the goal of allowing older people to live longer and independently at home.

In another embodiment, the present invention provides a novel fall prevention infrastructure that uses smart camera technology to automatically assess dangerous situations and notify caregivers in real-time on their mobile device. Using the present invention, caregivers define zones to track in a patient room along with actions and activities to be detected in those regions and the type of notification to be sent. The cameras and users are all connected to a server in the cloud, which collects events from the camera and sends notifications to users. Each notification is sent with a graphic to illustrate patient activities in the room.

In another embodiment, the present invention provides an embedded smart camera that analyzes pictures of the room autonomously, in real-time and provides knowledge of the scene to the cloud server, which then matches the events to the corresponding graphic before notifying the caregiver. In case of emergency, live imagery such a live video may be provided.

In another embodiment, the present invention provides explanatory notification and reduces the number of false alerts along with annoying room visits.

Examples of knowledge that the present invention provides while preserving privacy are: 1) Position of the patient on the bed (closer to the edges or in the middle, for how long the patient has been there); 2) Objects in zones that should be kept free (near the bed) to prevent the patient from potentially stumbling over them; 3) Patient is leaving the bed, but there are two more people in the room to help. In this case there is no need for the nurse to come; 4) Patient is visiting the rest room; and 5) Keeping track of patient activities across a predefined period of time.

In another embodiment, the present invention provides a system for use in hospitals and nursing homes where patients are at risk for falling which may cause injuries, sometimes serious.

In another embodiment, the present invention provides a monitoring system that is able to provide a "masked" view of the patient and his or her immediate environment in such a way as to not violate the patient's privacy. The system is capable to knowing if the patient is standing, if the patient is in the bathroom, is sitting on the bed, is laying on the bed or is on the floor, and an alarm is sounded that alerts the caregiver to the situation so that action can be taken to prevent a fall, thus improving patient safety.

In another embodiment, the present invention provides systems and devices for monitoring patients to prevent falls, monitoring the movement of Alzheimer's patients, security monitoring of prisoners, or of children, or monitoring any situation in which actions by any person could be hazardous to themselves or to someone else, and which actions to prevent harm need to be taken quickly.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
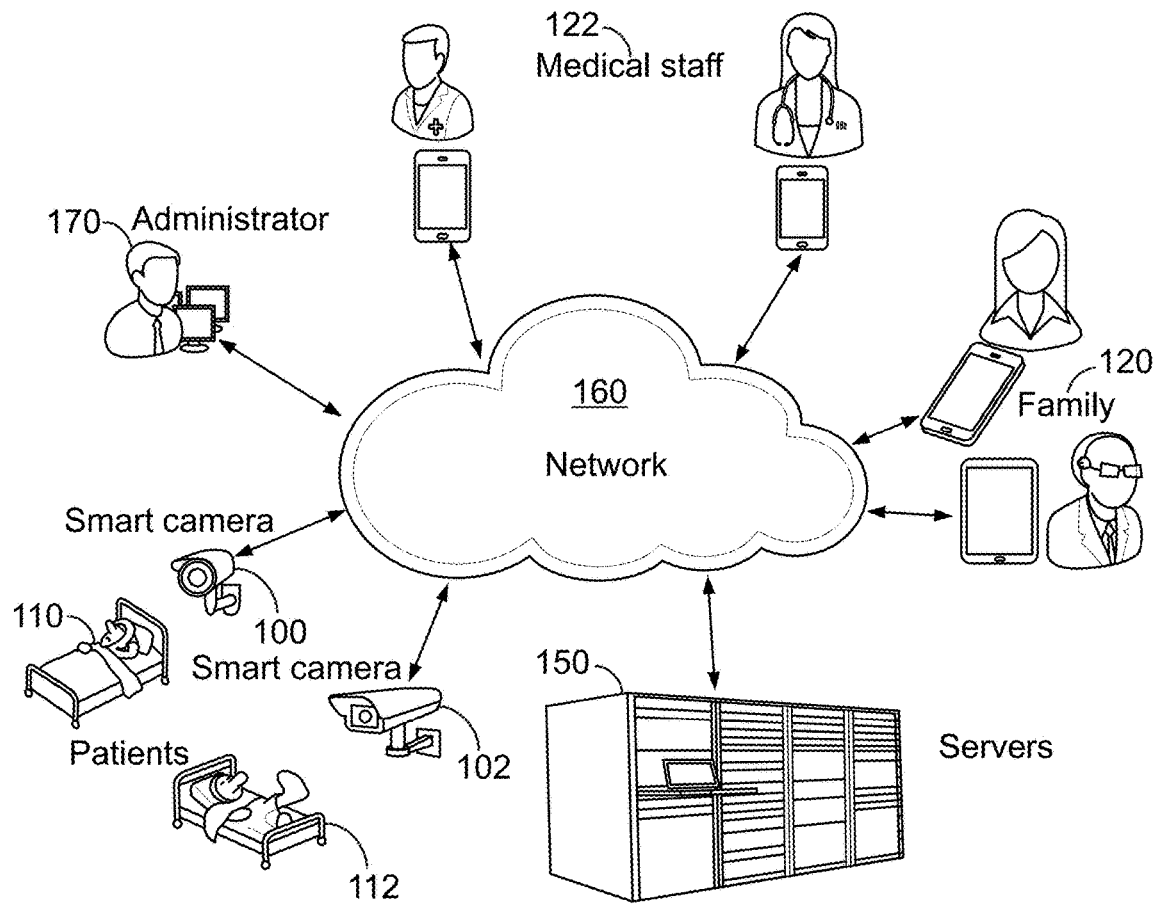
FIG. 1 illustrates the overall architecture for an embodiment of the present invention.

FIG. 1 shows the overall architecture of the system. A plurality of smart cameras 100 and 102 may be provided and are used to assess the environment around individuals such as patients and to detect predetermined conditions such as conditions that are dangerous, potentially harmful of that can lead to falling. In a preferred embodiment, one or more patients 110 and 112 may be looked after by one or more caregivers 122 at a hospital, a care facility, or private home. The environment could be a single room, a home or a part of it or some other predetermined area. A caregiver refers to a person in charge of providing care to the patient. This can be a family member or a member of the medical staff.

Smart cameras may be used to view the environment around one or more individuals according to input from a user. Input are regions of interest along with actions and events in those regions to be detected and to send notices. Upon detecting predefined actions and events in the regions of interest, the smart cameras or other processors may be used to trigger alarms, each of which may describe in symbolic notation the situation in the region or zone. The alerts may be forwarded to one or more servers 150. The communications may also be accessible through web services, which can be hosted on the Internet or a local network 160. Notifications may be forwarded to predetermined users such as caregivers and displayed on mobile devices as well as other devices. This can be a smart phone or any other mobile device that can connect a user to the system as well as more traditional stationary devices such desktop computers and the like. Users are registered in the system by system administrators 170 who insure proper functioning of the system.

Figure 2:
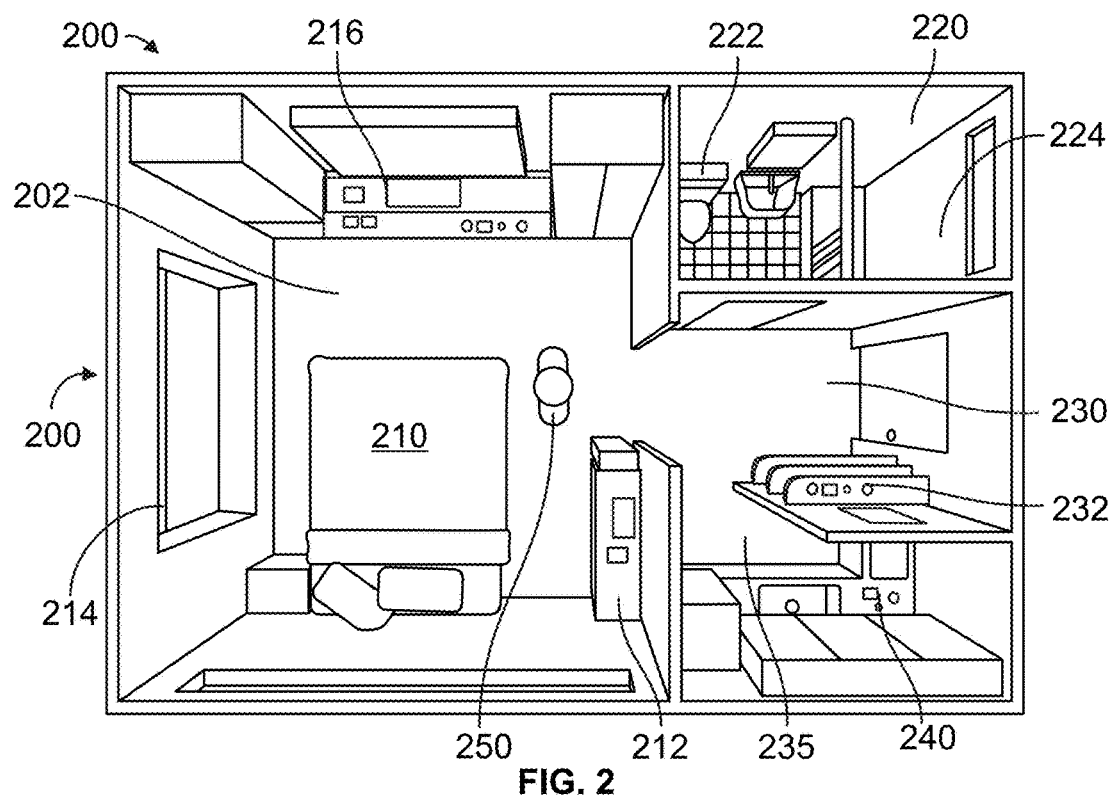
FIG. 2 illustrates an original image of a room.
Figure 3:
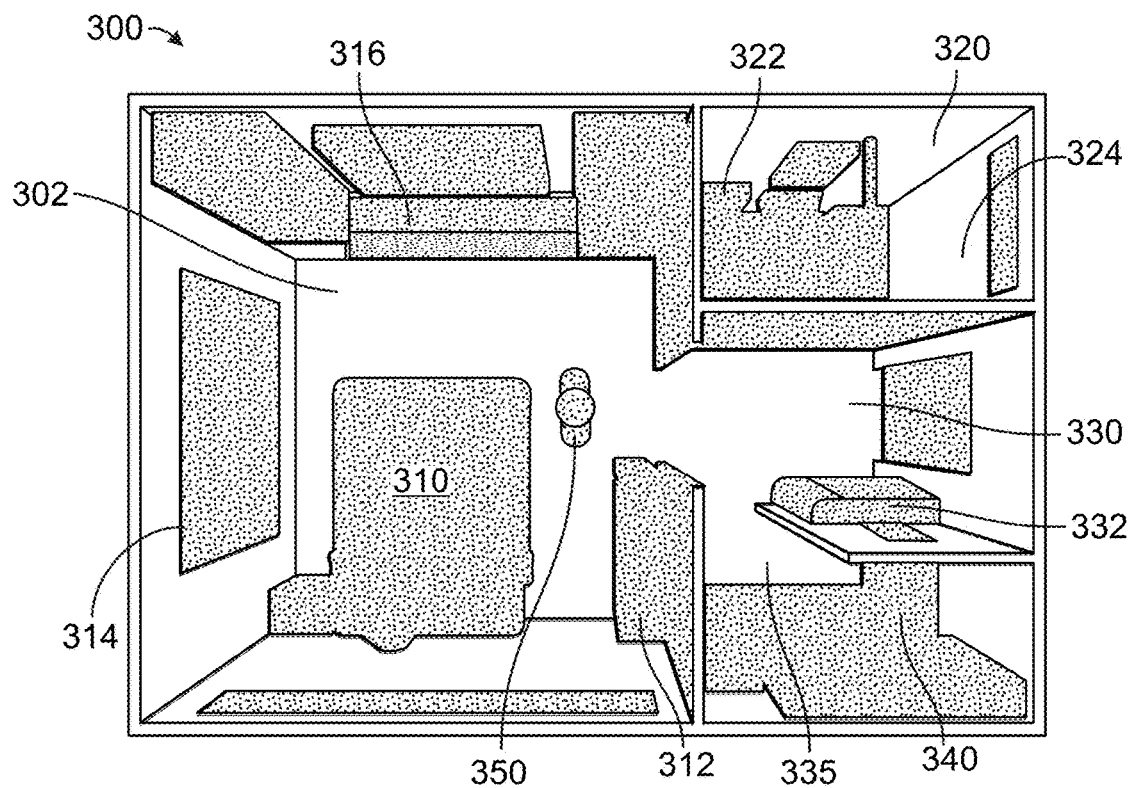
FIG. 3 shows a segmented display of the image shown in FIG. 2.
Figure 4:
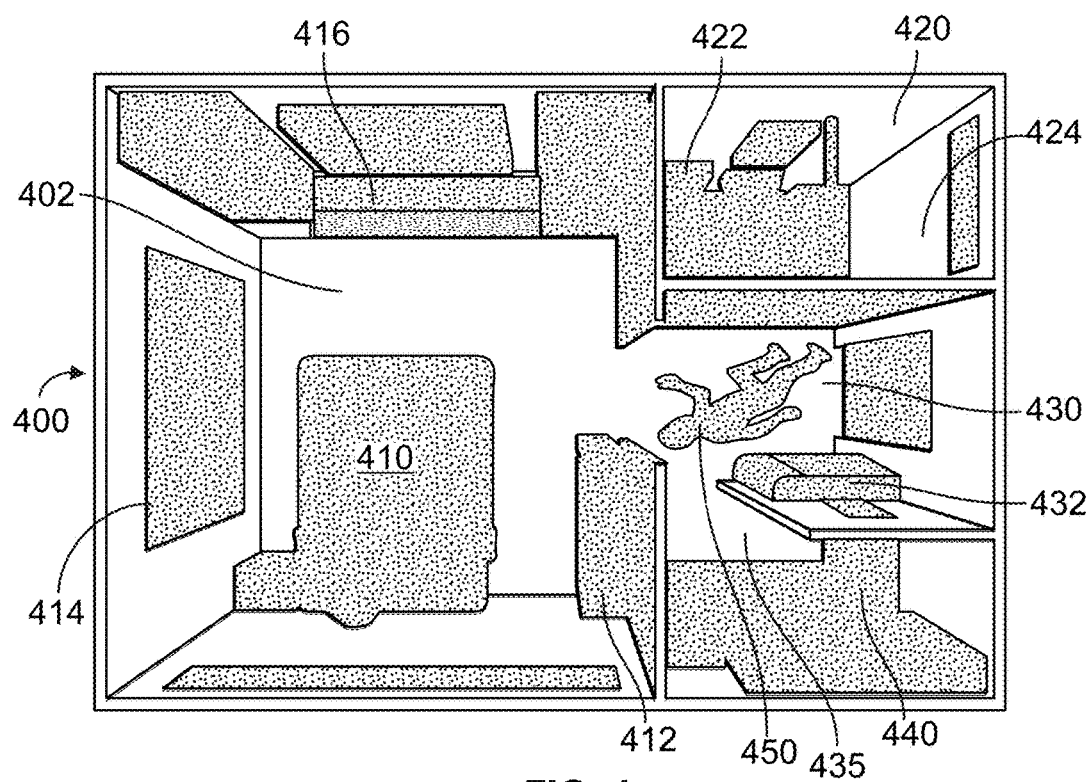
FIG. 4 shows a segmented display of the image shown in FIG. 2, with a person lying on the floor.

In a preferred embodiment, processing of information takes place prior to its display. In a preferred embodiment, processing of information takes place within the one or more cameras 100 and 102, thus preserving patient's privacy. For this embodiment, as shown in FIGS. 2-4, an original room may be imaged. The original image may then be segmented, as shown in FIGS. 3 and 4, with various features having been masked, blurred, modified or altered in other ways known to those of ordinary skill in the art to prevent visually observing actual features of the image.

In a preferred embodiment, an image is segmented by applying a mask that alters predetermined objects and individuals in the room. The mask may include textures and colors. In yet other embodiments, the representation of the room is masked using a segmentation of the scene that shows the object contour and multicolor texture that cannot reveal any information from the room.

FIG. 2 shows a zone of interests which may be an apartment 200 or some other predetermined area. The image may include subzones such as living quarters 202, bathroom 220, entry 230 and kitchen 235. As is also shown, further details of objects found in the zone and subzones may be segmented and include bed 210, dresser 212, window 214, dresser 216, toilet 222, shower 224, shelves 232 and kitchen appliances 240. Also, patient 250 is represented as standing but may also be represented in other postures as well such as sitting or lying down.

FIGS. 3 and 4 show representations of the image shown in FIG. 2 that have been segmented to maintain the privacy of patient 350 or 450. The segmentation has been applied to zone of interests 300/400, subzones such as living quarters 302/402, bathroom 320/420, entry 330/430 and kitchen 340/440. As is also shown, segmentation may also be performed on objects found in the zone and subzones such as bed 310/420, window 314/414, dresser 312/412, dresser 316/416, toilet 322/422, shower 324/424, shelves 332/432 and kitchen appliance area 340/440. Also, patient 350, as well as others, may be segmented and represented as standing. The segmentation may also be used to represent the patient 450 and others in other postures as well such as sitting or lying down as shown in FIG. 4.

Definitions of zones of interest as well as actions to track in those zones can be done through an interface on a mobile device or from a graphical user interface on a regular workstation or other device. The interface allows the user to see a masked representation of the room or area, with all objects. Regions of interest and objects therein can then be selected, drawn on, and parameterized through actions and events to be detected, the frequency of detection, the type of notification to trigger, etc. . . . Also, regions of interest and objects may be selected for masking or added to the representation. Some or all objects and regions may be masked.

Upon receiving a notification, the system may be configured to display a dummy image that represents the situation in the room. For example, if a patient is standing, then a silhouette of a standing person will be displayed in the region of interest as FIG. 3 illustrates or lying down as FIG. 4 illustrates.

When a predetermined event is detected, such as an emergency where a patient is lying on the floor, a live view may be activated to directly monitor the situation. It is also possible to activate a contour view that does not show colored images of the room, but just a segmented view with the contour of objects and person. The contour view preserves privacy, while still providing a picture of the current activities in the room.

In other aspects, the present invention may be configured to operate in three layers: The smart cameras layer where the processing of images takes place, and where notifications are generated. The server layer where information from the cameras are collected, sorted, and dispatched to users such as caregivers. The third layer is the mobile application that allows users to receive and process notifications.

Processing within the camera may be done using various image processing algorithms implemented on the embedded processor within the smart camera. In one embodiment, implementation is based on the Histogram of Gradient (HOG), Mixture of Gaussian (MOG) and Haar classifiers. However other segmentation algorithms can be used to identify and track people and objects along with their shape in the environment. The output of image processing is an interpretation of the current layout of the room. Based on this information a reasoning is performed by a machine learning algorithm to trigger alarms. Detections of actions and events are then framed in messages and sent to the server for further processing and caregiver notification.

The server layer implements the database and webserver, and provides storage for events and actions. On a smartphone, the application layer may be implemented as Android or iPhone apps and provides interaction capabilities with the user. Other mobile and electronic devices already in use in the facility can be used as well.

Figure 5:
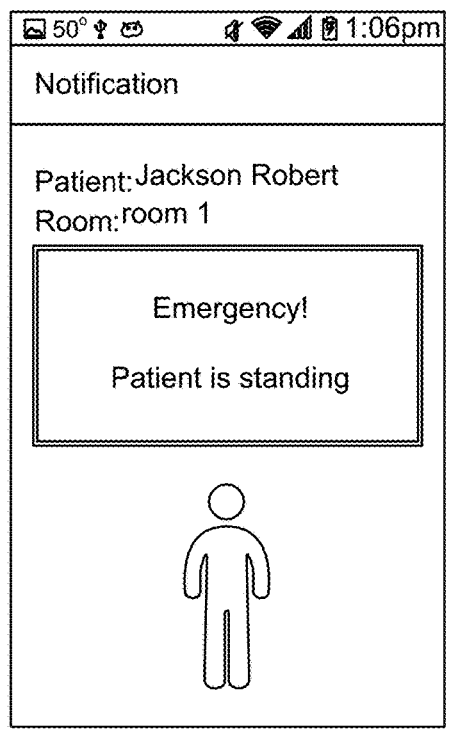
FIG. 5 is an illustration of a detected action on a mobile device for an embodiment of the present invention.

In other embodiments, the present invention provides efficient methods for scene understanding from images. Segmentation may be leveraged and annotation methods used to provide the whole picture of an area such as a patient's room to the caregivers, in symbolic form. Using a view of the room with masked objects, users may select and edit zones, actions and objects they want to be aware of in those zones. Using segmentation and object labeling, knowledge collected in the smart camera will be used to tell users or others what is going on in the area selected. Such information could be for instance. "Patient is lying on floor", "Patient is in restroom", "Patient is standing in zone X", "Patient is sitting on the bed and there are two visitors sitting on the couch". FIG. 5 shows one such notification.

In other embodiments, the present invention provides automatic assessments as previously described. In yet other embodiments, the present invention provides for the integration of all components in a workstation software. The software will provide interface for configuration and visualization of events.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A system for processing of information of an environment containing objects and a person comprising:
    one or more cameras configured to capture an image of a person and one or more objects in an environment;
    masking the image of the person;
    displaying a masked image of the person;
    said one or more objects in an environment are masked according to input from a user;
    predefined regions of interest;
    predefined events in said regions of interest;
    upon detecting a predefined action and event in said regions of interest, notices are sent to a user; and
    an interface configured to allow a user to see a masked representation of the objects and person and permits a user to select objects to mask and parameterized actions and events to be detected, the frequency of detection, and the type of notification to send.

2. The system of claim 1 wherein processing of information takes place within said one or more cameras.

3. The system of claim 1 wherein masking is performed using a segmentation that shows contour and multicolor texture.

4. The system of claim 1 wherein a masked representation of a person is displayed as standing, sitting or lying down.

5. The system of claim 1 wherein a live view may be enabled.

6. The system of claim 1 wherein a contoured view may be enabled.

7. The system of claim 1 wherein masking is based on the Histogram of Gradient (HOG), Mixture of Gaussian (MOG) and Haar classifiers.

8. A method of monitoring a person comprising the steps of:
    using one or more cameras to capture an image of a person and one or more objects in an environment;
    masking said image of the person and one or more objects;
    said one or more objects are masked according to input from a user;
    displaying a masked image of the person; and
    said regions of interest along with actions and events in those regions to be detected are predefined and upon detecting a predefined actions and event in said regions of interest, notices are sent to a user.

9. The method of claim 8 wherein processing of information takes place within said one or more cameras.

10. The method of claim 8 wherein masking is performed using a segmentation that shows contour and multicolor texture.

11. The method of claim 8 wherein a masked representation of a person is displayed as standing, sitting or lying down.

12. The method of claim 8 wherein a live view may be enabled.

13. The method of claim 8 wherein a contoured view may be enabled.

* * * * *